United States Patent

[11] 3,601,680

[72] Inventor Robert W. Beckwith
 1002 Greenfield Lane, Mount Prospect, Ill. 60056
[21] Appl. No. 812,104
[22] Filed Apr. 1, 1969
[45] Patented Aug. 24, 1971

[54] DC-TO-DC CONVERTER
 9 Claims, 8 Drawing Figs.
[52] U.S. Cl. .................................................. 321/2, 321/18, 321/45 R
[51] Int. Cl. .................................................. H02m 3/22
[50] Field of Search ...................................... 321/2, 18, 45

[56] References Cited
UNITED STATES PATENTS

| | | | |
|---|---|---|---|
| 2,663,806 | 12/1953 | Darlington | 307/315 |
| 3,315,146 | 4/1967 | Paice | 321/45 |
| 2,341,765 | 9/1967 | Rogers, Jr. et al. | 321/2 |
| 3,373,334 | 3/1968 | Geisz et al. | 321/2 |
| 3,418,557 | 12/1968 | Schaefer | 321/18 |
| 3,432,737 | 3/1969 | Hunter et al. | 321/2 |
| 3,439,251 | 4/1969 | Schaefer | 321/2 X |
| 3,486,071 | 12/1969 | Hedge | 321/2 UX |

Primary Examiner—William M. Shoop, Jr.
Attorney—Stone, Zummer & Aubel

ABSTRACT: A DC to DC converter embodying transistors in compound-connected multiple arrays, providing high current gain with special means for reducing switching losses, the arrays being driven in an alternate switching action to apply power pulses to an time-delay transformer under control of pulse-forming and gating subcircuits utilizing multivibrator means controlled by an inverter to produce sets of voltage-conformed gating pulses in such a manner that the power pulses are thereby shaped for substantially constant energy content as the result of automatically adjusting the duration of the pulses in inverse proportion to the instantaneous voltage of the DC source to produce a substantially constant output voltage between predetermined limits of source voltage for a given load condition. A low-loss reflex output-voltage regulating means may additionally modify the pulse shape in response to load variations. A dual-function isolation and time-delay input circuit prevents feedback into the source and also cooperates with start-stop protective means to guard the power transistors against destructive current surges during turn-on and turnoff of the converter.

FIG. 4. 101A PULSE-GENERATING, CONFORMING, GATING & SWITCHING CONTROL CIRCUIT

Inventor
Robert W. Beckwith
By: Stone, Zummer & Livingston attys.

Inventor
Robert W. Beckwith
By: Stone, Zummer & Livingston attys

DC-TO-DC CONVERTER

PRIOR ART

Attention is called to U.S. Pat. No. 3,075,136 to Jones (CL. 321/45 ) as the closest art presently known; the converter system therein disclosed employing different circuit means and components from those disclosed herein and operating upon different principles, including, among others, a control of pulse width by feedback from an output circuit.

This invention has as its object the provision of a DC to DC converter system of a type utilizing solid state electron valve and switching devices and capable of providing a DC current of substantial magnitude at a desired voltage from a DC source of different voltage.

While adapted to general usage, the disclosed converter system is especially advantageous in providing a highly regulated DC supply at one of the standard voltages (for example, 48 volts) presently used for telemetering purposes, microwave and carrier communication and like applications at utilities power stations and substations having a local direct current battery of a different voltage (for example, 125 volts) or a source which varies objectionably in potential due to loading by other equipment, maintenance problems or like causes.

The system described and claimed hereinafter is characterized by high efficiency, stability and compactness with complete feedback isolation from the station or source battery, optional grounded or nongrounded operation, and excellent regulation in respect to variations in both input voltage and output loading, all afforded by novel circuit means comprising a combination of coacting subcircuits including an inverter circuit producing timing pulses at a substantially constant frequency; a novel power-switching transistor configuration for intermittently applying power from the local DC supply in equal energy pulses to a special transformer forming part of an integrating output circuit; a gating circuit controlled by said timing pulses and governing a driver means for the power-switching circuit in conjunction with a pulse width control circuit operative to modify the power pulses in inverse proportion to the voltage existing at the supply source, as well as in relation to load variation at the inverter output.

A preferred illustrative embodiment of the invention in accordance with the appended claims is described in view of the accompanying drawings in which:

FIGS. 4, 6, 7, and 8 illustrate progressively expanded variations of the special power-switching transistor configurations.

Figure 1:
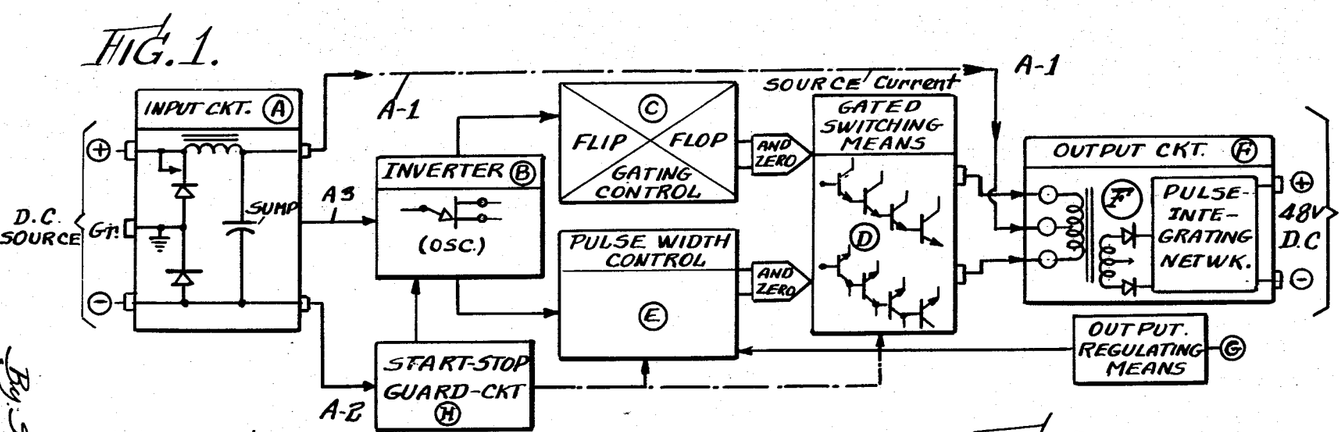
FIG. 1 is a block diagram depicting the relationship of the combination of subcircuits comprising the converting system.

In its general aspects, the converter system embodies the combination of subcircuits depicted by block diagram in FIG. 1 wherein the input circuit -A- constitutes an intermediate source of constant direct-current taken for conversion from input terminals adapted for connection with the local battery or DC supply (for example, but not by limitation, a standard 125 -volt battery system at a power plant).

One of the functions of the input circuit is that of isolating the converter by a series choke means from the local supply and other equipment served thereby to prevent possible reflective disturbances caused by substantial pulse voltages generated at the 800 and 1600 Hz. frequencies present in other subcircuits of the system, the output of which is similarly isolated in respects pointed out hereafter.

Additionally, the input circuit provides an optional neutral ground connection -Gr-; and an intermediate constant current supply sump in the form of a parallel capacitance of sufficiently high value, cooperatively with the aforesaid choke means, to render the converter largely independent of voltage fluctuations and other transient disturbances in the local DC supply.

As indicated by the connecting lines A-1, A-2 and A-3 in FIG. 1, current from the sump source is gated in formed pulses alternatively to two windings forming part of the split-winding primary of a special transformer T-1 in the output circuit F, the respective energizing circuits for each such winding being identical and completed in pulsed alternation under control of an intervening control circuit means comprising the inverter B, a gating control C, a gated power switching means D, cooperative with a pulse width control E, and output regulation means G.

Figure 2:
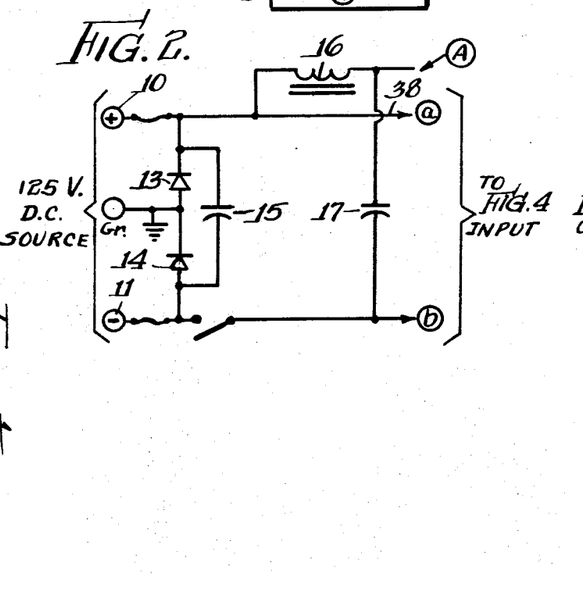
FIG. 2 is a detailed schematic of the input circuit means.

The input circuit A, as seen in its more detailed aspect in FIG. 2, may be connected with the local 125-volt battery or other DC supply at terminal 10 and 11 and, where required, to a working ground at terminal Gr, it being noted that system ground connections are commonly avoided in utility power installations by reason of their being a hindrance to fault location tests, and accordingly the converter ground Gr is made neutral with respect to the local battery by blocking diodes 13 and 14 shunted by a capacitor 15 to bypass signalling frequencies for microwave, carrier communication and like equipment served by the converter.

An isolation choke 16 in an upper branch 38B of the DC current gated to the power transformer, inhibits feedback of high-voltage pulses from the power section and also effects uniform charging of a sump capacitor 17 having a capacity of the order of 820 mfd. these components also functioning in another mode as part of a start-stop time delay means.

Figure 4:
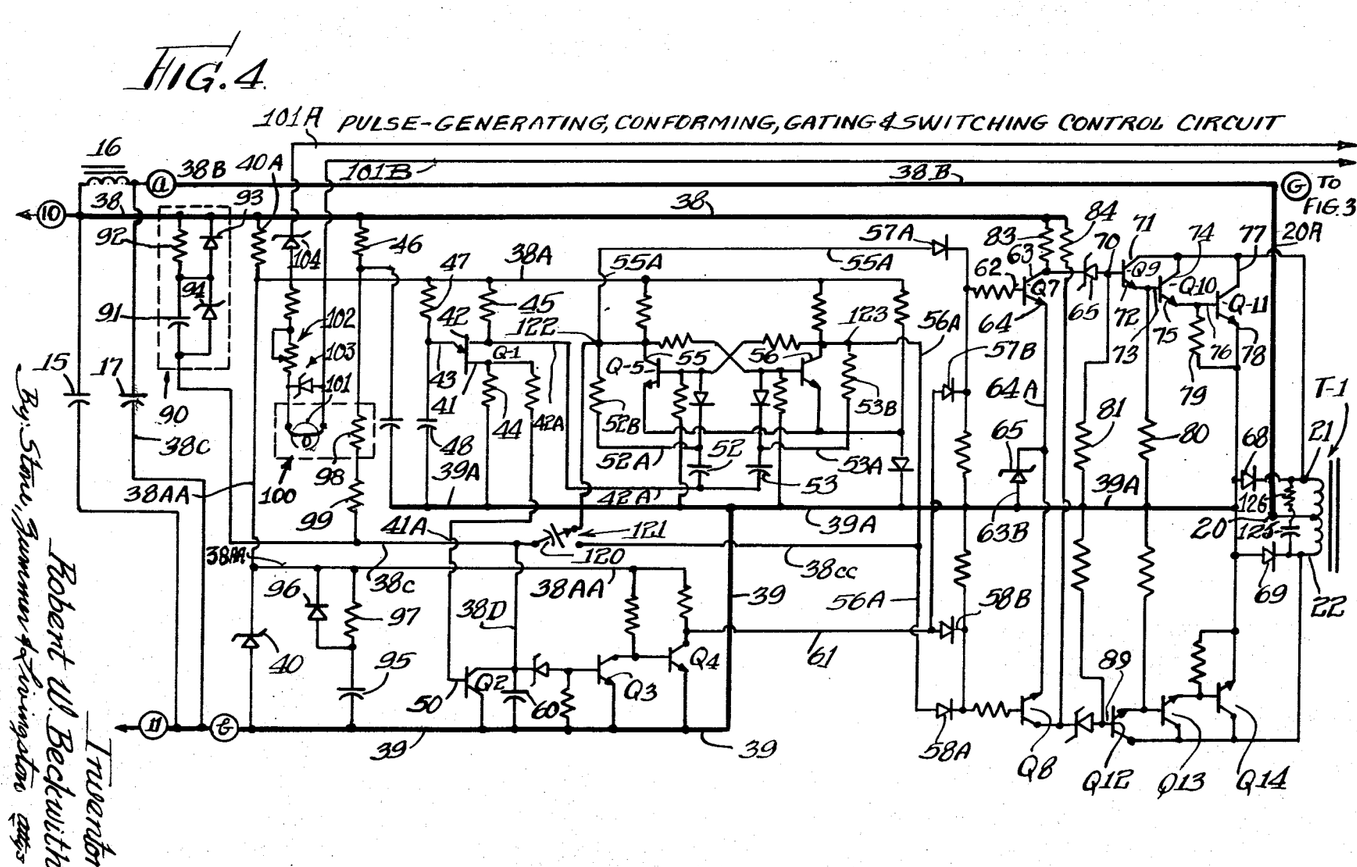
FIG. 4 is a schematic of a pulse shaping and gating control circuit cooperative with the input and output circuits of FIGS. 2 and 3.

DC current from the sump capacitor 17 is applied to a special transformer in the output circuit F in the form of gated pulses shaped and timed by the control circuit of FIG. 4 in a manner to be explained in detail hereafter, such pulses being applied at terminals 20, 21 and 22 of the split winding 23 of said transformer, which may have one or more split secondary windings 24 and 24A. The center-tap terminal 20 of the primary winding connects via conductor 20A with positive potential on the upper input feed bus 38B (FIGS. 2 and 4), and the remaining primary terminals 21 and 22 respectively connect via conductors 21A and 22A with corresponding gating terminals 21G, 22G at the control circuit output, as will appear more fully hereafter.

Figure 3:
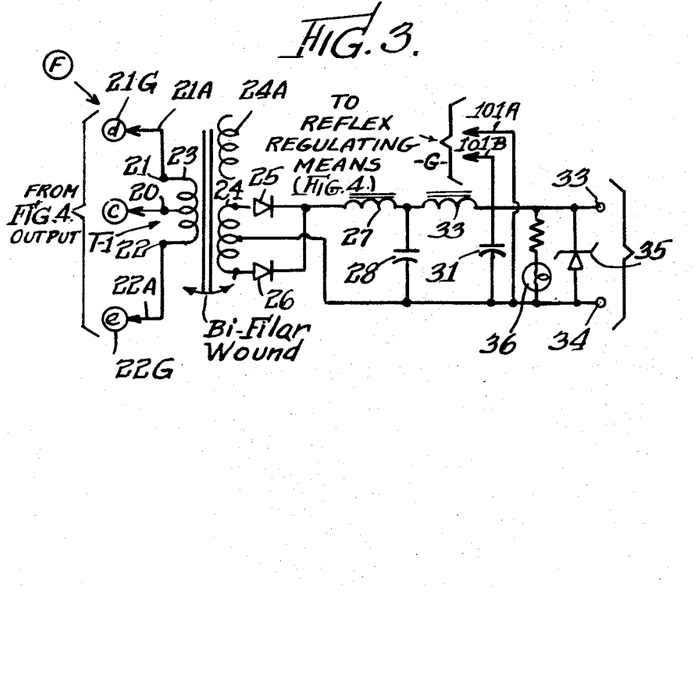
FIG. 3 is a detailed schematic of the output circuit.

Paired power pulses of square waveform and effectively identical energy content are supplied in alternation to said transformer primary windings and returned to zero to energize the same oppositely to avoid sustained unidirectional flux components and to produce corresponding pulses in the secondary winding 24 for rectification by diodes 25, 26.

The high degree of voltage regulation attained by the system is achieved in part by maintaining a constant ratio of width of the shaped power pulses to the magnitude of the voltage of the local DC source and the load, together with integration of the rectified output currents into an averaged current free of voltage spikes as the result of terminating the rectifiers in a network presenting an input substantially free of capacitance and of predominantly inductive character.

Thus, the terminal network detailed in FIG. 3 presents an inductive input in the form of a choke 27 in series with the output of the rectifying diodes 25, 26, a filter capacitor 28 being shunted across the output following this choke. Ripple filtering means follows the input choke and may take the form of a second choke 33 in series with choke 27 and followed in turn by another shunt capacitance 31 across the output to terminals 33 and 34, a Zener diode 33 being shunted across said terminals for protective purposes.

Regulation in respect to fluctuations in the supply voltage, which in most 125-volt installations of the type described can be expected to vary between 105 and 156 volts, is such as to hold the converter voltage between +7. and −+2. volts of its 48-volt rating with an efficiency of 80 to 90 percent depending upon variations in supply voltage, and load fluctuations ranging from 10 percent to full load. Such performance results from the wave shape employed, maintenance of a constant pulse energy, employment of a special output transformer, and the above-described terminal network, together with control of imbalance in the power switching network resulting from conditions inherent in the use of symmetrical circuits to drive the transformer primaries in the manner shown; and minimization of iron losses in the transformer caused by the range of frequency attending use of the square wave configuration.

The transformer losses are substantially alleviated by employment of a toroidal construction for the output transformer T-1 with a high-efficiency nickel-iron core and bifilar windings in both primary and secondary operative to reduce transient effects and designed to operate at about one-third the ampere turns which would produce saturation.

The efficiency of the system is still further improved by use of a ferrite core in choke 27 in the output network to reduce losses otherwise resulting from the high square wave voltages developed across the respective windings thereof.

A further regulation, effected as a function of load variation, involves a reflex circuit which is isolated from the metallic circuit of the control circuit means of FIG. 4 by use of photoresistive means, as will appear in the description to follow.

Means for converting DC source current to voltage-conformed constant energy pulses energizing the primary windings of the output transformer, in alternation, as described in view of FIG. 3, comprises the combination of subcircuits heretofore generally designated in the block diagram of FIG. 1, as the inverter B, gating control C, gated switching means D, pulse width control E, and reflex load regulation means G, all utilizing solid state electron control devices to produce, in timed sequence from the local DC supply, pairs of square wave, width-to-voltage proportioned power pulses such that the pulses of each pair are substantially identical in shape and energy content and proportioned at least to the input supply voltage, and adapted to be integrated as an averaged output current at substantially constant voltage by the output circuit means.

The inverting means is the source of primary control pulses and, as seen in FIG. 4, may comprise a simple relaxation oscillator preferably utilizing a unijunction transistor Q-1, having first and second base electrodes 41, 42 respectively connecting to bias voltage through resistors 44 and 45 from positive and negative feed conductors 38A and 39A branching from the DC input terminals 10 and 11, the unijunction emitter 43 being pulsed from an RC timing means consisting of resistor 47 in series with a capacitance 48 across said feed conductors and having a time constant operative to fire said transistor at a preferred frequency of 1600 cycles per second and provide two timing pulses in each cycle, to drive the flip-flop at 800 Hz.

The voltage on the feed conductor 38A and its branches is regulated by a Zener diode 40 shunted thereacross through resistor 40A. The oscillation period of the unijunction inverting means will be substantially constant at the required frequency, subject only to inconsequential variation due to component characteristics.

Alternate gating pulses for the two side circuits of the power switching means are provided by multivibrator means including a bistable flip-flop type employing transistors Q-5 and Q-6 connected in the network shown for mutually cross-controlling firing and extinction responsive to trigger pulses supplied by the unijunction oscillator via conductor 42A from the base-2 unijunction terminal and applied to the signal side of two coupling capacitors 52 and 53 each of which will supply, via respective conductors 52A and 53A and corresponding series resistors 52B and 53B, a trigger pulse operative at the appropriate time to turn on the appertaining transistor which happens to be off, and turn off the transistor which is conducting, in the known manner, such that the two transistors are toggled in alternation from ON to OFF conditions to produce two gating pulses per cycle of the oscillator, whereby the output transformer will be pulsed at a frequency of 800 Hz. by precisely equal pulses appearing at the respective collectors 55, 56 of transistors Q-5 and Q-6 and applied via respective collector leads 55A and 56A to corresponding gate diodes 57A and 58A, each of which constitutes one of a pair of gate diodes 57A—57B or 58A—58B, the said diode pairs respectively comprising first and second pulse gates for the two transformer primary windings.

Thus, the first pair of gate diodes 57A—57B controls application of energizing power pulses to primary winding 20-21, while the second pair of diodes 58A—58B controls the pulses to winding 20-22.

The pulse gates are enabled or "opened" when the voltages on both cathodes of either pair of diodes go to zero simultaneously; but this condition can exist in the configuration shown only when the flip-flop causes one diode of a given pair to go to zero, and the pulse-stretching means likewise causes the voltage on the remaining diode of the said given pair to go to zero at the same time. Under the conditions described, these gates may be considered as AND gates for zeros.

Thus, the alternate determinant signal conditions from the flip-flop subcircuit can enable the corresponding gates only with the concurring determinant signal conditions from the output of the pulse-stretching means both caused to occur at some particular angular position in each half-cycle of flip-flop operation, the said angular position always being a function of the instantaneous voltage afforded by, or existing at, the local or primary DC supply terminal 10 and 11.

Regarded in another way, there will be a particular instant in each half-cycle of the gating operation during which the pulse-stretching means will provide the necessary zero-potential condition for one of the gate diodes of a given pair at the same instant the companion diode of such pair is also brought by the pulse stretching means to the concomitant zero-potential condition necessary to satisfy the "gate open" requirements; and the particularly instant in each half-cycle when the output potential thus controlled by the pulse-stretcher fulfills this zero-voltage condition is determined by the voltage existing at that instant at the supply battery, that is to say, from moment to moment thereat.

The aforesaid positioning of the gating pulse in each half-cycle is achieved by use of an RC timing means in the pulse stretcher unit to produce a firing potential in a capacitor the charging rate for which is determined by an associated resistance in series with the charging voltage (effectively the local input voltage) whereby the charging time will vary inversely with the voltage of the supply, and hence the particular instant when the charge reaches firing potential will determine at what instant, early or late in each half-cycle when the power pulse will be gated to the transformer, which in turn is is tantamount to determining the width (full or less than full), and therefore the energy content, of the power pulse.

Thus, if the supply voltage is high, the RC control potential in the pulse-stretching subcircuit is reached early in the square wave power-pulse interval, causing the output of the pulse stretcher to go to zero sooner, with a shorter pulse duration than will be the case when the supply voltage is lower and the RC control potential requires a longer time to reach the control potential and therefore permits the power pulse to persist longer. The circuit parameters are chosen so that the gating pulses at the maximum expected local supply or battery voltage (commonly 156 volts in the usual 125-volt system) are completed in less than the full half-cycle allowed for each pulse of a pair.

The circuit means E which monitors and regulates the inverter output voltage by pulse width adjustment, as aforesaid, comprises transistors Q-2, Q-3 and Q-4 connected in the monostable configuration shown in FIG. 4 for bias from the branch feed conductors 38AA and 39, the operation being such that a positive triggering pulse taken from base-1 of the unijunction transistor Q-1 in each firing thereof is applied via conductor 41A to the base 50 of Q-2 causing the latter to conduct and instantly discharge capacitor 60 thereby turning off transistor Q-3 and turning on Q-4 to reduce the voltage on conductor 61 and gate diodes 57B and 58B to Zero during an interval when one or the other of the gate diodes 57A or 58A will be in the zero potential condition required to gate a power pulse to the output transformer through the special transistor switching means D as the result of firing one or the other of the driving transistors Q-7 or Q-8.

Thus, assuming that the gate diodes 57A—58A of the upper pair are brought to the zero-potential, or "open-gating" condition described, the potential on base 62 of Q-7 causes conduction in the circuit through collector 63 and emitter 64 thereof to provide a shunt path, via conductor 63A, Zener diode 65 and conductor 63B, to negative feed conductor 39A, thus removing the turn-on bias for base 70 of transistor Q-9, thereby turning off the latter and its associated transistors Q-10 and Q-11 forming the special power array of the upper arm of the power-switching subcircuit, whereby to terminate the power pulse theretofore applied to transformer terminal 21 via conductor 21A and terminal 21G.

Exactly the same operations occur in the lower arm of the "full-wave" power-switching circuit in respect to turning off the driver transistor Q-8 and transistors Q-12, Q-13 and Q-14 to extinguish the power pulse to the other half of the primary winding at terminal 21 via conductor 21A from transistor Q-14 and output terminal 22G. Diodes 68 and 69 are protective to block inverse voltages induced in the transformer windings or across the input filter choke and are mainly precautionary in respect to these and possible switching transients.

The turn-on bias applied to base 70 of Q-9 is derived through resistor 83, and that for the base 89 of Q-12 in the lower power arm is derived through resistor 84, it being observed that the respective currents through these resistors do not traverse the load and represent wasted power, which constitutes one reason requiring the power gain of the switching transistors to be quite high, other reasons including switching losses and unavoidable overall network losses. All such losses and the high output of the system (e.g. 10 amperes at 48 volts for the configuration of FIG. 8) would require single transistors in each arm or side circuit of the "full-wave" output circuit to have a current gain of about 400; but transistors capable of such performance are not commercially available, and for such purposes the novel configuration of grouped arrays of parallel transistors with a common driver, such as disclosed in FIGS. 4 or 8, has been adopted with the object not only of attaining these and greater current gains efficiently, but also of combining the transistors in a way such that the current of the initial transistor in each compound array will traverse the load regardless of how many transistors comprise such array, as particularly brought out in FIG. 7, for example; and further, to combine the transistors in such a way as will eliminate balancing networks such as have heretofore been commonly required in other multiple transistor arrangements having as their purpose an increase in current gain.

Transistors Q-9, Q-10 and -Q-11, comprising the power-switching triplet in the upper arm of the array of FIG. 4, are connected with their collectors in parallel and their emitters effectively in parallel, and are driven in effect as a single transistor by a driver such as Q-7. Thus, all of the appertaining collectors 71, 74 and 77 of the driven trio are tied together; and the emitter 72 of Q-9 is connected to the base 73 of the succeeding transistor Q-10 whose emitter 75 connects in turn to the base 76 of the last transistor Q-11, the emitter 78 of the latter constituting one terminal of an energizing circuit for one primary winding of the output transformer which is completed via collector 77 and terminal 21 of said winding when the array Q-9, Q-10 and Q-11 is conductive.

In every such power array, each emitter-to-base interconnection will be tied to a joint or common emitter connection through a current-equalizing means such as the resistors 79 and 80; while another resistor 81 from the base 70 of the leading or input transistor Q-9 of this set accelerates turnoff by providing a path for escape of current carriers to negative bus conductor 38A. The base 70 of Q-9 is normally biased for turn-on through resistor 83 from supply conductor 38, but is shunted for turnoff by the drop through the collector 63 and emitter 64 of driver Q-7, as previously explained. A Zener diode 65 assures positive turnoff and turn-on of Q-9 to guard against differences in transistors (such as Q-7) by fixing the turn-on voltage of Q-9 (e.g. at 10 volts) so that marginal voltage won't turn Q-9 on when it is supposed to be off.

Since the power switching configuration is symmetrical for full-wave energization of the transformer, the companion array or trio of transistors in the lower arm or side circuit, comprising transistors Q-12, Q-13 and Q-14, will be understood to consist of like components and to operate in exactly the same manner as the array in the upper arm just described.

Figure 5:
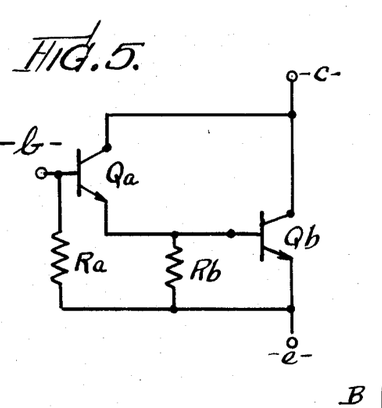

The principle of operation of the foregoing power-switching configuration is explained in view of the more simple array of FIG. 5, wherein the transistors $Q_a$ and $Q_b$ may be considered of equal rating, and resistor $R_a$ provides a conductive path for elimination of charge carriers from intermediate bases, such resistors desirably having a value selected to equalize the current passed by $Q_a$ and $Q_b$, in which case $R_a$ will cause no additional loss, since the product of the total collector current and the collector-emitter drop across $Q_b$ must be lost in any event.

Since the maximum voltage to appear across $R_b$ in the example of FIG. 5 will be the forward emitter-to-base voltage, a value of resistance for $R_b$ can be found which will not absorb any appreciable additional power, and this array can be treated as a single transistor wherein the total current gain will be very nearly equal to the sum of the individual current gains of the two transistors of the set (neglecting $R_b$) while the total collector current will be exactly the sum of the respective collector currents of the two or other number of transistors, it being noted, again, that the IR drop across the collector-emitter path represents a form of loss in every case.

The explanation for the improved performance of these compound power configurations is believed to be that the intertransistor bypassing paths of predetermined conductivity or resistivity represented by the resistors $R_a$, $R_b$, $R_c$, etc., are responsible for an appreciable speeding up of the turnoff characteristics of the several transistors comprising the set, along with a 9 eduction in transient effects in the overall power circuit, which action in turn is believed very probably due to rapid elimination of charge carriers during turnoff.

Figure 6:
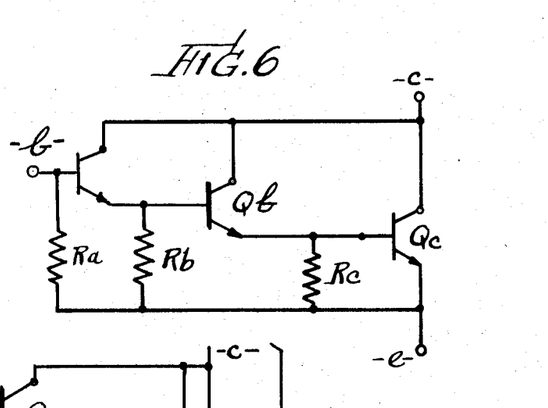

The resultant "single transistor" behavior of the power arrays is such that arrangements like that of FIG. 5 can be expanded to include three transistors in a tandem triplet configuration such as shown in FIG. 6, which may be regarded as the equivalent of the configuration of one of the primary side circuits of FIG. 4, with transistors Q-9, Q-10 and Q-11 of the latter corresponding to $Q_a$, $Q_b$ and $Q_c$ of FIG. 6. By way of illustrating relative component values which might be used for the equalizing resistors in such an arrangement, it may be assumed that the three transistors are types 2N 3902, and that the collector-emitter bias voltage will be the full supply voltage (e.g. 125 V.) on supply bus 38, and that the load impedance is represented by the output circuit including the transformer and its terminating network and a load in the expected range, under such conditions, and assuming a desired output current of four amperes, equalizing resistors $R_a$ and $R_b$ could have a value of about 1000 ohm each, while $R_c$ could have a value of only 10 ohms it being observed that the base resistors, such as $R_a$ in FIGS. 5 and 6, contribute to rapid turn-on but do not participate in equalization or distribution of the emitter currents as do resistors $R_b$ and $R_c$.

While the addition of equalizing and turnoff resistors such as $R_a$, $R_b$, $R_c$, etc. would appear to involve a disadvantage in that the individual current gains are reduced by the "equalization" to that which might be theoretically obtainable at half-current in the case of a two-transistor array according to FIG. 5, or to one-third in a triplet array according to FIG. 6, and so on, actually it is found that an increased drive is achieved which is self-regulating and produces an unexpected improvement in the overall performance of the set, regarded as a single transistor, owing to the fact (referring again to FIG. 5) that if $Q_b$ is caused to have less current gain than normal, and $Q_a$ is driven to saturation, then more current will flow in $Q_a$, and $Q_b$ will be driven harder and the net result of the sum of these gains will represent an increase plus significant advantages in faster turnoff time, lowered operating temperatures, and some transient relief.

The significance of current equalization within an array may be illustrated by assuming (again with reference to FIG. 5) that if an overly high resistance is substituted for R$b$ to begin with, some improvement in turnoff will nevertheless be observed; but if such resistance is then progressively lowered, more and more current is diverted from Q$b$ until a value of resistance will be reached at which the division of current between the two transistors becomes about equal, and this condition will represent the optimum working value in which the total current gain, switching response and time will be a practical maximum.

Figure 7:
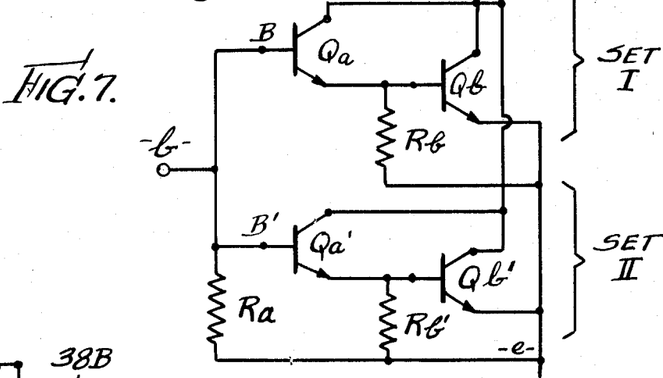

Consistantly with the performance of arrays such as those of FIGS. 5 and 6 as single transistors, it becomes possible to further compound the configurations in sets of parallel arrays in the manner shown in FIG. 7 wherein duplicate sets of two-transistor arrays, designated as Set I and Set II for reference, are connected with the respective bases B and B' of the respective input transistors Q$a$ and Q$a$ ' in each set tied together as a single input base terminal $b$, while all of the collectors C$a$, C$b$, and C$a$ ', C$b$' are tied together with a single collector terminal $c$, the respective emitters E$a$, E$b$ and E$a$', E$b$' likewise being joined with a single emitter terminal $e$. Each of the sets I and II is provided with a corresponding complement of equalizing resistors R$b$, R$b$', but with only one turnoff resistor R$a$.

Figure 8:
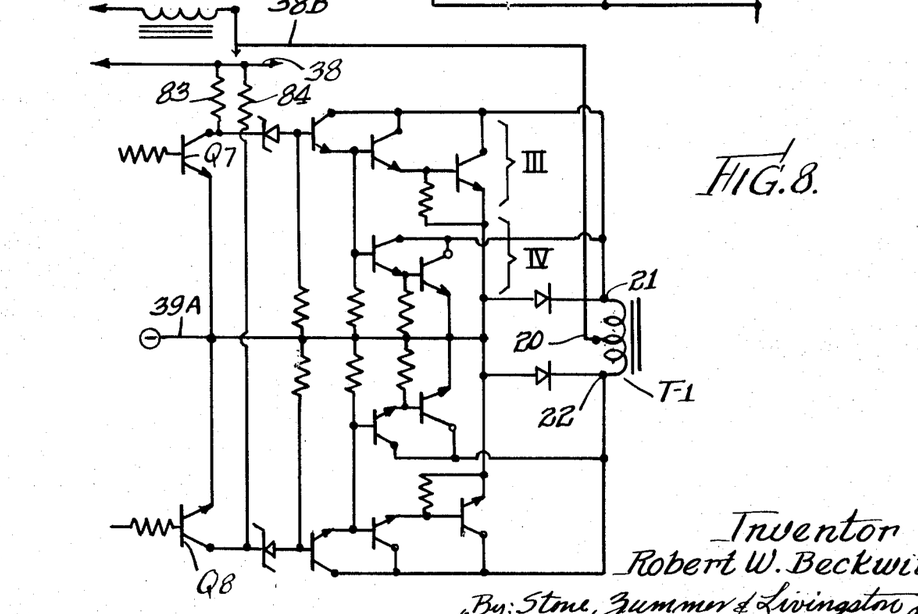

FIG. 8 illustrates still another modified configuration as an expansion of the arrangement of FIG. 7, and one which is shown in condition for substitution for the power transistor system of FIG. 4 to yield a high-current output of the order of 10 amperes at 48 volts, it being observed in FIG. 8 that each of the side circuits for the two primary windings of the power transformer consists (referring to the upper arm) of two sets of arrays III and IV characterized in that set III employs three transistors, while the companion parallel set IV employs only two, which is substantially a combination of FIGS. 5 and 6, or of FIG. 7 wherein FIG. 5 (regarded as a single transistor) replaces Q$b$ in set I.

Thus, the number of compounded transistors in each array, and the multiple combinations of various arrays in parallel connection, may be extensively varied to achieve increased current gain while preserving the rapid-switching action and other benefits afforded by the equalizing resistors, it being observed that in all such compounded multiple arrays as exemplified by FIGS. 7 and 8, for example, the current gains for individual arrays in what may be designated for reference as a tandem arrangement, will afford a total current gain which will be very nearly the sum of the current gains of the individual transistors comprising the array, whether two, three, or more; and the total gain for the entire configuration will be the sum of the current gains of all of the arrays which are connected in parallel, ignoring the small "turnoff" and "equalizing" losses.

Thus the current gain of the configuration of FIG. 5 is very nearly the sum of the individual gains of Q$a$ and Q$b$; and that of FIG. 6 the sum of the current gains of Q$a$, Q$b$ and Q$c$; while the gain for FIG. 7 is the sum of the current gains of Q$a$ and Q$b$ to which is added the sum of Q$a$' by Q$b$'; the gain for FIG. 8 being the sum of Q$a$, Q$b$ and Q$c$ to which is added the sum of Q$a$' and Q$b$' (neglecting as always nominal losses caused by inclusion of the turnoff and equalizing resistors R$a$, R$b$, R$a$', etc.). In all other respects the variously expanded compound configurations can all be treated as a single power transistor driven by a single driving transistor and producing the increased current gains noted in each instance with markedly decreased switching losses attended by lower operating temperatures, the latter improvement being considered to be the result of reduction of the switching time, for example, from 10 to 1 microseconds.

While such switching arrays can easily handle many amperes of current, they require protection from excessive voltage surges which can act across the collector-emitter paths both when the system is first turned on, and when it is shut-off. As will appear from a consideration of FIG. 4, when the power is first switched on the full supply voltage at the DC source (e.g. 105 to 156 v.) could act in the transistor power circuits through the transformer primary windings if either array happened to be in the conductive state, since the output circuit which terminates the secondary windings offers very low impedance at such times owing, among other things, to the discharged condition of capacitors 28 and 31. Under such conditions the possibility always exists for either or both transistor arrays to be switched on and exposed to the full current surge and instantaneous destruction.

A similarly dangerous possibility exists when the converter is turned off because the transistor-switching operations could quite possibly stop before the charge on the sump capacitor 17 has been dissipated.

Accordingly, protective circuit means and guard functions are provided to assure that the switching operations will be in full progress at turn-on, and will positively be sustained after turn-off, at least until sump capacitor 17 is fully discharged, this circuitry being designated generally in FIG. 1 as the "-Start-Stop Guard Means"H and which comprises, with reference to FIG. 4, first, the coaction of the inductance of the supply input choke 16 and the capacitance of sump capacitor 17, functioning in another mode as a time-delay circuit affording several milliseconds lag in the rise of the source voltage when the converter is first turned on; said guard means comprising, secondly, parts of the network within the dotted-line enclosure 90 of FIG. 4 acting during such turn-on delay interval to accelerate the action of the pulse-stretching circuit by effecting a maximally rapid initial charging of the relatively much smaller capacitance 60 (approximately 0.01 mfd.) which forms part of the R/C timing means for the pulse stretcher, acting through the relatively much greater capacitance (about 1.0 mfd.) of a capacitor 91 which is charged directly from raw DC source voltage on bus conductor 38 (bypassing choke 16 and capacitor 17), with the result in the pulse-stretcher that transistor Q-3 is almost instantly turned on, and Q-4 accordingly almost instantaneously turned off at the moment the converter apparatus is switched on.

The latter turn-off of Q-4 causes a maximum momentary narrowing of the gating pulses on conductor 61, while at the same moment the power-switching begins by brute force action of raw source voltage from conductor 38A (i.e. bypassing choke 16 and capacitance 17) on the inverter transistor Q-1 to start the toggling action of the flip-flop circuit. Thus, at turn-on the narrowing of the power pulses and starting of switching section is caused to be substantially simultaneous.

In the aforesaid guarding network 90, the said "larger" capacitance 91 has its series resistor 92 shunted by a diode 93 in series with a breakdown diode 94 with the latter connected to shunt said capacitor 91, so that the latter will be rapidly discharged, during turn-off of the converter system, through said diode 93; but as soon as the system reaches a steady state following turn-on, the Zener diode 94 breaks down and this part of the network 90 thereafter performs what is, in effect, an amplifying function because of its nonlinear operation in compensating for output whenever the input or source voltage decreases, in accordance with the following explanation.

When capacitor 91 is fully charged, the resultant voltage across diode 94 causes the latter to conduct, and this amounts to a subtraction of voltage from the source across said capacitor 91. At the desired upper limit of the source voltage (e.g. 156 v.) the pulse width determined by the aforesaid combination of resistor 92, diode 94 and capacitor 60, will be narrowest, and a substantial part of the (excess) source voltage will be dropped across the Zener diode 94; but as the source voltage drops toward the lower limit (e.g. 105 v.) the proportion of source voltage acting across the resistor 92 increases nonlinearly owing to a nonlinear change in the drop across the Zener diode 94, and the pulse width widens accordingly to maintain the output voltage substantially constant, it being for this reason that the controlling effect of this network is considered one of "amplification" in respect to its nonlinear function in contributing to the regulation of the output voltage in relation to changes in input or source voltage.

When the converter system is switched on, the 125-volt DC source conductor 38B connecting with the power transistors through the transformer primaries is delayed owing to reactance of the choke 16 and sump capacitance 17, while at the same time the inverter oscillator Q-1 is started almost instantly from direct source voltage on conductor 38 which shunts around the choke 16 and capacitor 17; and in addition the flip-flop toggle action starts with equal rapidity owing to the previously explained surge charging of the small timing capacitance 60 through the much larger capacitance 91 in the guard circuit section 90; the relatively large turn-off and hold-over capacitance 95 (10 mfd.) however, is prevented from charging rapidly because of the series resistance 97 (about 47 k. ohms) with the result that the pulse stretcher, like the flip-flop, begins operations instantly at turn-on to start the power-switching action.

When the converter is switched out of service, capacitor 95 will discharge through diode 96 to apply power to feed conductors 38A and 38AA, whereby to continue the switch action until sump capacitor 17 is fully discharged. Also, at turn-off, the capacitance 91 will be discharged through diode 63.

The close voltage regulation of the system is further extended to compensate for changes in output voltage caused by variations in the load, this part of the regulation being achieved by a substantially "lossless" photoreflex pulse width control means generally indicated in FIG. 4 at 100, and comprising a photoresponsive resistance 98 connected in series with limiting resistors 46, 99 across the source-voltage feed conductors 38, 38C so as to be, in effect, in parallel with the pulse width control portion of the Start-Stop Guard Network 90, said photoresponsive resistance 98 being effective to modify the charging rate of the timing capacitor 60 of the pulse-stretcher independently of the R/C constant of capacitor 91 and resistor 92 therein.

The photosensitive resistor means 98 will preferably be of the commercially available type having encased therewith a light source 101 connecting via conductors 101A, 101B across the output terminals 33, 34, as in FIG. 3, so that the light intensity will change in proportion to the output voltage, variable resistance means 102 being provided to adjust the response for the desired output level. A protective Zener diode 103 is shunted across this light source to conduct at an upper voltage limit and prevent premature and accidental burnout of the lamp, there being a second Zener diode 104 in series with said lamp to determine the lower operating limit thereof. As the output voltage rises the luminosity of the lamp 101 increases thus increasing the conductivity of photoresistor 98 and therefore the voltage on the timing capacitor 60, thereby narrowing the width of the power pulses to provide a proportionate decrease in the output voltage.

In a symmetrical full-wave circuit, such as the power-switching section of FIG. 4, some imbalance is expected between the opposite side circuits or arms of the power transistor configurations driving the two transformer windings, owing to several variables such as the characteristics of individual transistors, lack of exact balance in the transformer windings, differences in the rectifying diodes, and so on. In the case of a DC-to-DC converter, such imbalance can be particularly detrimental and cause severe overheating in one or the other banks of power transistors.

Assuming, generally, that the power transformer is of suitable quality to begin with, a major portion of this trouble arises from unequal driving of the two primary windings. Further aggravated by imbalance effects reflected from the secondary circuit including contributions from the rectifying diodes. Some of this kind of imbalance can be relieved by careful choice of transistors, diodes, and associated components, and by adjusting the turns in the two primaries; however, these are largely empirical expediencies having no predictable constancy and, when attempted, mainly add to manufacturing costs without assurance of permanence.

A highly satisfactory means for alleviating such imbalance is afforded in the control circuitry of FIG. 4 by inclusion of drive balancing or equalizing means serving to strengthen the weaker, and weaken the stronger of the two pulses of each pair of power pulses delivered to the respective transformer primary windings, for example, by shortening the stronger pulse and lengthening the weaker pulse automatically. Such reciprocal pulse-balancing action is achieved by selective connection of a small balancing capacitance 120 between the collector of one or the other of the flip-flop transistors Q-5 or Q-6, and the collector of the pulse-stretching transistor Q-2, depending upon which of the power-switching transistor arrays is contributing principally to the imbalance, selector switch means 121 being provided to connect this balancing capacitance to the appropriate flip-flop output, once the offending source is identified.

The operation of the aforesaid imbalance-correcting means 120 is such that in one alternation there will be an increase in voltage at flip-flop terminal 122, followed by a decrease at terminal 123 in the other alternation (or vice versa depending upon the position of switch 121) with the result that timing capacitor 60 will have its charge increased in the first instance and decreased in the second, or vice versa, with a consequent shortening or lengthening of the appertaining switching pulses and a resultant balance or equalization in the energization of the two transformer primaries which tends to prevent overdriving in one or the other phase of each alternation.

It can be shown that such overdriving occurs in a spiked current portion of the offending power pulse, which represents a powerless voltage rise most easily detected by use of an oscilloscope to display the spikes in the power pulses either at the outputs of the switching transistor arrays or in the transformer windings, such spikes representing a rapid rise in current without a corresponding increase in the flux in the transformer core, which amounts to "power in" without corresponding "power out", and a substantial loss which translates into heat. In order to guard against possible damage to the power transistors due to unpredictable high-current spikes appearing across the total transformer primary under some types of load, it is desirable to include a spike suppressing means in the form seen in FIG. 4, consisting of a capacitor 125 (e.g. about 0.03 mfd.) and a series resistor 126 (e.g. about 5,000 ohms) shunted across the entire primary, it being noted that this type of spike control is of a different character from that intended by the means 120, 121 in respect both to the magnitude and cause of the spiking.

It is contemplated that the foregoing apparatus as specifically shown and described by way of example and explanation of a preferred embodiment and mode of operation thereof, may be modified within the scope of the appended claims. The particular form of the pulse generating, timing, shaping, gating and switching arrangements may be changed and, depending upon the service required, some of the subcircuits and features of the described system may be omitted or altered, for example, the rectifying and pulse-integrating means of the output circuit may be omitted if it is desired to use the device as an inverter; or the reflex voltage regulating means may be omitted from the output circuit where a fixed load is applied or the load causes only slight or noncritical voltage variation. The transistor means in the switching circuit may be reduced to a single transistor or other electron valve device in each side circuit (in the case of full-wave operation) or the simplest of the compound-transistor arrays, according to FIG. 5, may be employed where output current requirements are relatively moderate; and if highest efficiency is not demanded, the winding in the output transformer need not be of the bifilar character described, but may be of common commercial grade, and may comprise an autotransformer.

I claim:

1. A DC-to-DC converter comprising an input circuit adapted for connection to a source of direct-current; an output circuit adapted to deliver DC to a load and including a linear transformer having a primary winding and a secondary winding, control circuit means operative from source current to generate timed and shaped control pulses the amplitudes of which are substantially constant and the duration of which are conformed in inverse magnitude to the instantaneous voltage of the source; switching means actuated by said control pulses to apply source current in successive power pulses to said primary winding whereby the latter is energized by pulses of source current which have a substantially constant energy content; means in said output circuit operative to rectify and integrate power pulses derived from said secondary winding to provide a unidirectional and substantially steady state current for utilization by a load, said transformer primary winding being split into two sections and said switching means being actuated in power cycles by gating pulses applied thereat in each power cycle, and said control circuit means includes an oscillator providing two timing pulses per cycle of oscillation, together with multivibrator means triggered under control of both timing pulses in each oscillator cycle to produce angularly spaced gating pulses in pairs in each power cycle with the spacing between the successive gating pulses in each pair being changed in inverse proportion to each change of source voltage at any given instant from said normal value thereof, said switching means being operative under control of each pair of gating pulses in each power cycle to switch a power pulse of source current into a different one of said primary sections, multiple arrays, each comprising a plurality of transistors having base, emitter and collector electrodes; said multiple arrays comprising a group operatively associated with each transformer primary section, and the several arrays comprising each said group being connected in parallel and with the bases of the first transistor in each array of the group being connected to define a joint input base terminal, driving circuits, said joint input base terminal connecting with a corresponding driving circuit, and the respective common collector terminals connected to define a joint collector terminal; and the emitter electrodes of the last transistors in each array being connected to define a joint emitter terminal, and the said joint collector and emitter terminals being connected to source current through the appertaining primary section.

2. Apparatus according to claim 1 wherein the windings comprising the primary sections and the secondary of said transformer are of the bifilar type, and pulse-integrating means in the output circuit for presenting a predominantly inductive input to the rectified power pulses derived from the secondary winding as aforesaid.

3. Apparatus according to claim 2 further characterized by the provision of means for adjusting for overdrive in one or the other of said transformer primary sections due to difference in strength between the power pulses produced in companion half-cycles of any full power cycle, said adjusting means including means selectively connectable with said control circuit means to modify the respective control pulses during either half-cycle of any given power cycle, such that the weaker pulses of one half-cycle is widened and the stronger pulse of the companion half-cycle is narrowed, each respectively by an amount proportioned with respect to the other to produce substantially equal driving effects for the appertaining power pulses respectively energizing said primary sections in the given power cycle.

4. Apparatus according to claim 1 further characterized by the provision therein of output voltage regulating means including a device responsive to voltage in said output circuit and cooperative with said control circuit means responsive to changes in output voltage from a predetermined normal value thereof, to modify the duration of said control pulses in inverse magnitude to the voltage existing in said output circuit from moment to moment, but substantially independently of the conforming action effected by said control circuit means responsive to changes in source voltage, whereby to maintain said output voltage substantially at said normal value thereof.

5. Apparatus according to claim 1 further characterized by the provision of start-stop subcircuit means including further electron valve means and cooperative circuit means connecting with source current and said first subcircuit means for operation to delay action of full source voltage when the converter circuit is turned on for operation by said DC source until such time as said first subcircuit means is fully operative in switching action as aforesaid; said start-stop subcircuit means being further operative to supply power to continue said switching action a predetermined length of time after said converter circuit is turned off to stop operation thereof by said DC source.

6. Apparatus according to claim 21 wherein the said conformation of parameters is such as to reduce the energy content of said pulses to a predetermined low value during the start, at least, of said switching action.

7. A DC-to-DC converter including a power transformer having a secondary winding delivering converted DC energy to an output circuit, and a primary winding energized by power pulses of direct-current from a DC source having a predetermined normal voltage; circuit means operative in cycles at a predetermined frequency to convert source current into square-wave power pulses at said frequency; switching means operative responsive to gating pulses in sets including a first and a last gating pulse in each set to apply said power pulses in power cycles to said primary winding; means generating gating pulses in sets as aforesaid and applying same to said switching means in power cycles each including at least one set of gating pulses; the angular spacing between the first and last gating pulse of each said set determining the width of each corresponding power pulse; and pulse width control means operative responsive to the magnitude of the existing source voltage during any power cycle to position the last gating pulse angularly relative to the first such pulse in each set initiating a power cycle to determine a normal pulse width corresponding to said normal source voltage, said pulse width control means being further operative to change such position in an inverse proportion to the deviation of said source voltage from said normal value from cycle to cycle and thereby adjust the pulse width as necessary from time to time to maintain a substantially constant energy level in said power pulses notwithstanding variations in source voltage between predetermined limits, at least.

8. Apparatus according to claim 7 wherein said pulse generating means includes timing means employing resistance and capacitance in an R/C timing combination the time constant of which is variable in accordance with the magnitude of a charging voltage acting therethrough, and said R/C combination is connected to be charged by the voltage of said source whereby to alter the angular relation between the first and last pulses of any set of gating pulses to determine said normal and adjusted widths in the manner and for the purpose aforesaid.

9. In a DC-to-DC converter circuit adapted to be connected to a source of direct-current and turned on and off in respect thereto to start and stop the converting action thereof, the combination with an output circuit adapted to deliver converted DC to a load; transistor means adapted to be turned on and off in switching action to energize said output circuit in power pulse of DC conducted thereto by said transistor means; timing circuit means operative to actuate the transistor means in switching action as aforesaid; and start-stop guard means comprising a first subcircuit means operative to prevent action of full source voltage in said transistor means at starting turn on of the converter circuit for a predetermined delay interval; means cooperative with said timing circuit means to cause said switching action to be in full progress during said interval; and circuit means operative to continue said switching action a predetermined time after the converter circuit is turned off to stop the converting action.

PO-1050
(5/69)

UNITED STATES PATENT OFFICE
CERTIFICATE OF CORRECTION

Patent No. 3,601,680      Dated August 24, 1971

Inventor(s) Robert W. Beckwith

It is certified that error appears in the above-identified patent and that said Letters Patent are hereby corrected as shown below:

Abstract, Line 5, "time-delay" should be --output--.

Column 1, Line 53, "4" should be --5--.

Column 2, Line 13, "terminal" should be --terminals--.

Column 2, Line 27, after "mfd." insert --,--.

Column 4, Line 24, "terminal" should be --terminals--.

Column 4, Line 32, "particularly" should be --particular--.

Column 6, Line 37, "9 eduction" should be --reduction--.

Column 6, Line 58, after "ohms" insert --,--.

Column 8, Line 23, after "H" insert --,--.

Column 8, Line 50, "section" should be --action--.

Column 9, Line 67, ". Further" should be --, further--.

Column 11, Line 53, "pulses" should be --pulse--.

Column 12, Line 12, "21" should be --5--.

Signed and sealed this 18th day of April 1972.

(SEAL)
Attest:

EDWARD M. FLETCHER, JR.　　　　　　ROBERT GOTTSCHALK
Attesting Officer　　　　　　　　　　Commissioner of Patents